(12) United States Patent
Kusnezoff et al.

(10) Patent No.: US 8,512,901 B2
(45) Date of Patent: Aug. 20, 2013

(54) HIGH-TEMPERATURE FUEL CELL SYSTEM

(75) Inventors: Mihails Kusnezoff, Dresden (DE); Sebastian Reuber, Dresden (DE)

(73) Assignee: Fraunhofer-Gesellschaft zur Förderung der angewandten Forschung e.V. (DE)

(*) Notice: Subject to any disclaimer, the term of this patent is extended or adjusted under 35 U.S.C. 154(b) by 0 days.

(21) Appl. No.: 13/381,568

(22) PCT Filed: Jun. 24, 2010

(86) PCT No.: PCT/EP2010/003798
§ 371 (c)(1),
(2), (4) Date: Mar. 28, 2012

(87) PCT Pub. No.: WO2011/000499
PCT Pub. Date: Jan. 6, 2011

(65) Prior Publication Data
US 2012/0178005 A1    Jul. 12, 2012

(30) Foreign Application Priority Data
Jun. 30, 2009   (DE) .......................... 10 2009 031 774

(51) Int. Cl.
*H01M 8/06* (2006.01)
(52) U.S. Cl.
USPC .......................... 429/423; 429/415; 429/416
(58) Field of Classification Search
None
See application file for complete search history.

(56) References Cited

U.S. PATENT DOCUMENTS

| 5,413,878 A | 5/1995 | Williams et al. |
| 2004/0241505 A1 | 12/2004 | Hershkowitz et al. |
| 2007/0111054 A1 | 5/2007 | Gottmann et al. |
| 2007/0231650 A1 | 10/2007 | Jiang et al. |
| 2008/0233442 A1 | 9/2008 | Takada |

(Continued)

FOREIGN PATENT DOCUMENTS

| EP | 1571726 A1 | 9/2005 |
| EP | 1686643 A1 | 8/2006 |
| JP | 2170368 | 7/1990 |
| JP | 5047393 A | 2/1993 |

OTHER PUBLICATIONS

International Application No. PCT/EP2010/003798, International Search Report and Written Opinion mailed Nov. 15, 2010, 20 pgs.

(Continued)

*Primary Examiner* — Patrick Ryan
*Assistant Examiner* — Wyatt McConnell
(74) *Attorney, Agent, or Firm* — Schwegman Lundberg & Woessner, P.A.

(57) ABSTRACT

The invention relates to a high-temperature fuel cell system which can be operated with at least one hydrocarbon compound, preferably with methane or a gas containing methane such as natural gas or biogas. It is the object of the invention to increase the efficiency of high-temperature fuel cell systems and to allow a more flexible operation. In the system in accordance with the invention, individual fuel cells are present which are connected electrically in series and form the stacks. The stacks are flowed through after one another by fuel gas which contains hydrogen and which flows into a first stack of the system from a reformer and a suitable hydrocarbon compound is supplied via further connection lines in the flow direction of the introduced fuel gas sequentially into further stacks to the respective stack for a direct internal reforming of a hydrocarbon compound at anodes of the fuel cells of the stack and air is supplied as an oxidation means at the cathode side to the individual fuel cells of the system.

11 Claims, 5 Drawing Sheets

(56) References Cited

U.S. PATENT DOCUMENTS

Figure 1:
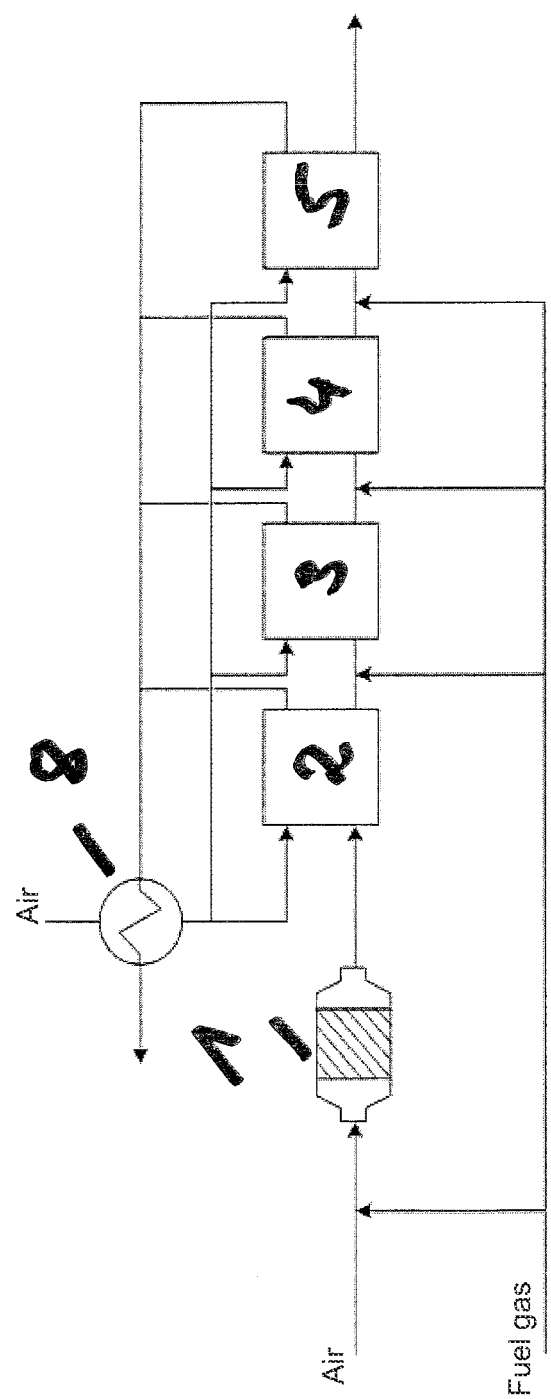

2008/0248349 A1 10/2008 McElroy et al.
2009/0092883 A1 4/2009 Ozeki et al.
2010/0036566 A1 2/2010 Hayami

OTHER PUBLICATIONS

International Application No. PCT/EP2010/003798, International Preliminary Report on Patentability issued Jan. 4, 2012, 12 pgs.

HIGH-TEMPERATURE FUEL CELL SYSTEM

PRIORITY CLAIM TO RELATED APPLICATIONS

This application is a national stage application under 35 U.S.C. §371 of PCT/EP2010/003798, filed Jun. 24, 2010, and published as WO 2011/000499A1 on Jan. 6, 2011, which claims priority to German Application No, 10 2009 031 774.0, filed Jun. 30, 2009, which applications and publication are incorporated by reference as if reproduced herein and made a part hereof in their entirety, and the benefit of priority of each of which is claimed herein.

The present subject matter relates to a high-temperature fuel cell system which can be operated with at least one hydrocarbon compound, preferably with methane or a gas containing methane such as natural gas or biogas. Propane, butane or ethanol can, however, also be used as further examples for the operation.

A reformation of the methane can be required for the operation of such fuel cells to provide hydrogen for the electrochemical reaction of the fuel cells in a fuel gas.

This reaction of the splitting of hydrocarbon compounds can be carried out in additional reformers, the reformate containing hydrogen then to be introduced as fuel gas into high temperature fuel cells. In this respect, stacks can be formed with a plurality of individual fuel cells which are connected electrically in series.

A direct internal reforming can be carried out within fuel cells. At the sufficiently high temperatures, methane is broken down into hydrogen and carbon monoxide on the presence of water. A cooling of fuel cells at their anodes can be achieved by the endothermic reaction and the hydrogen required for the operation can simultaneously be made available. Further hydrogen becomes free on the conversion of carbon monoxide to carbon dioxide on the presence of water. This is, however, an exothermal reaction which, however, only releases a considerably smaller heat quantity than the above-explained endothermic reaction.

It is thus proposed to provide two fuel cell stacks in US 2008/0248349 A1. In this respect, the direct internal reforming should be carried out in fuel cells of one of the two stacks and a cooling should thereby be achieved. At least one further stack is only operated with the residual fuel gas of the first stack which has been obtained by the internal reforming. A particularly critical region within a high-temperature fuel cell system should thus additionally be cooled and a more homogenous temperature distribution should be reached. The cooling in the critical entry region cannot be avoided by the supply of fresh gas known therefrom.

In this respect, the efficiency is in particular negatively influenced in the cells operated with the residual fuel gas as a consequence of the water formed due to the reaction. A high water proportion in the fuel gas reduces the Nernst voltage of a fuel cell. The useful electrical voltage potential of the respective fuel cell therefore falls and the power density is also correspondingly smaller.

A further aspect to be taken into account is the required heat dissipation which, in an approach, can take place substantially with the air supplied at the cathode side as an oxidation agent. The air is supplied considerably hyperstoichiometrically for the actually required oxygen to dissipate the heat becoming free in the electrochemical reaction. For this purpose, however, due to the required large volume flows and the flow losses and pressure losses which cannot be avoided due to the design, high compressor powers are required which in turn reduce the total efficiency.

A reduction of this volume flow by a cooling of the air before the entry is not expedient since it cools the electrolyte considerably locally on the entry so that its electrical conductivity falls and in addition mechanical strains due to the temperature difference cannot be avoided.

An objective can include to increase the efficiency of high-temperature fuel cell systems and to enable a more flexible operation.

A high-temperature fuel cell system in accordance with the present subject matter having a planar cell geometry comprises individual fuel cells which are electrically connected in series and which form a plurality of stacks. The stacks and naturally also the fuel cells in the stacks are flowed through after one another by fuel gas which contains hydrogen and which flows from a reformer into a first stack of the system. The fuel gas utilization of the total system can be increased by such a cascading and the total efficiency of the system can be increased. A plurality of further connection lines are, however, also present in the flow direction of the introduced fuel gas, via which at least one suitable hydrocarbon compound being introduced into stacks arranged in the following for a direct internal reforming of the hydrocarbon compound(s) to a fuel gas containing hydrogen at anodes of the fuel cells of the stack. In this respect, the connection stub through which the hydrocarbon compound used is introduced into a stack should be provided with a cooler. Soot formation can be avoided by the cooling.

Air can be supplied as an oxidation agent at the cathode side to the individual fuel cells of the system. In this respect, the air volume flow can, however, be considerably reduced with the present approach since only so much air is required that oxygen is available with slight hyperstoichiometry at the cathodes of the fuel cells for the electrochemical reaction. The total electrical efficiency can thereby be increased by up to 5% in comparison with conventional systems since smaller power is required for the operation of the compressor.

The stacks of a system in accordance with an embodiment of the present approach can be in this respect also connected fluidically in series.

In a system in accordance with an embodiment of the present approach, a steam reformer can be used with which a fuel gas containing hydrogen can be provided from a hydrocarbon compound for the operation of the cells. This fuel gas is introduced into a first fuel cell of a first stack and can flow through the whole system so that residual fuel gas is discharged from the last fuel cell of the last stack in the flow direction. At least some of the residual fuel gas can be returned to the reformer and can in this respect be utilized for the reforming of the hydrocarbon compound(s). The reforming can be simplified by an anode residual gas circulation into a reformer. At the same time, heat can be reclaimed since the residual fuel gas has approximately the operating temperature of the fuel cells. The thermal energy required for the operation of the reformer can thereby be reduced.

A reformer is in particular required on the start-up of the system to be able to provide fuel gas to a sufficient degree for the operation of the fuel cells. This fuel gas can only be introduced into the first stack arranged after the reformer and this stack can be operated with it. Once a sufficiently high temperature has been reached in fuel cells, the hydrocarbon compound(s) can then be supplied to the individual stacks via the connection lines. Water formed in the electrochemical reaction is present at the anode sides of the fuel cells, with a reforming of the hydrocarbon compounds and accordingly also a release of hydrogen being achievable with said water.

A system in accordance with an embodiment of the present approach can also be operated solely with fuel gas from the reformer in part load operation.

In the case that stacks of a system are connected electrically in parallel to one another, an electrical load can be applied on start-up only to the stack arranged directly after the reformer so that in this respect the water required for the electrochemical reaction can be provided by the internal process. An electrical decoupling of stacks is thereby possible.

It has, however, also been found that another reformer type can also be used with the invention with which a reforming can be achieved by partial oxidation (POx) processes. For this purpose, the technical plant effort and the effort for the operation of the reformer is lower in comparison with steam reformers. The lower suitability of this reformate with respect to steam reforming due to the smaller hydrogen content, the higher oxide portions and the nitrogen content does not have such a considerably effect since the larger portion of the hydrogen in the fuel gas can be obtained at the anodes of the fuel cells due to the direct internal reforming of the hydrocarbon compounds. There is the possibility with the invention of being able to carry out a partial oxidation in combination with an internal steam reforming at a system.

Since water is formed by the electrochemical conversion which accumulates in the flowing fuel gas in the system, the available anode surface can be adapted thereto in the invention. For this purpose, the number of fuel cells forming a stack can be increased by the system from stack to stack in the flow direction of the fuel gas. There is however, the possibility, alone or in addition thereto, of successively increasing the size of the surfaces of individual fuel cells and in particular of the anode surfaces in this direction.

As a rule of the thumb, in this respect, a doubling of the fuel cell number can be carried out in a following stack with respect to the number of fuel cells in the previously arranged stack.

The possibility also results from this of then supplying a hydrocarbon compound with a larger volume flow to a stack following a stack arranged before it so that a larger quantity of hydrogen can be made available for the electrochemical reaction by the direct internal reforming. A further cooling can also be achieved by the endothermic reforming reaction.

In addition, there is the possibility of regulating the volume flow of hydrocarbon compounds supplied to the individual stacks. The regulation can be carried out while taking account of the respective temperature and/or of the electrical power at the respective stack. The volume flow of the hydrocarbon compound(s) which is supplied to the stacks and the number of individual fuel cells can be increased so far until fuel cells adjacent thereto are not undercooled.

Adapter plates with which the stacks can be separated from one another can be arranged between the stacks. The hydrocarbon compound can then also be supplied to the stack via the adapter plates.

It is advantageous to support the reforming catalytically. For this purpose, a suitable catalyst, for example nickel, which is particularly suitable due to its temperature resistance, can be used. A catalyst can in this respect be arranged within an adapter element, in fuel gas channels or also in anode spaces of the fuel cells and can be flowed against or flowed through by the hydrocarbon compound(s). A through-flow is possible in an open-pore structure in the form of a foam or network. Such a catalytic coating can, however, also be formed in the designated regions in which catalytic coating a catalytically acting elements is contained or the coating is formed therewith.

The catalytically supported reforming should preferably have taken place before the anode surface is reached. On a reforming which has, for example, already taken place in an adapter plate, an indirect internal reforming can also be carried out and utilized additionally.

In addition to the special possibility of the supply of hydrocarbon compound(s) in each stack or in a plurality of stacks present at a system in accordance with the invention, the air supplied to the cathodes of fuel cells can also taken place individually via a separate line for each stack. The air can be introduced at a lower pressure by such a parallel supply possibility, whereby the energy requirement and the losses in the operation of the compressor required for this purpose can be further reduced.

Unlike systems in which the balance temperature of the reformer determines the composition of the fuel gas which is supplied to the fuel cells, in particular the methane portion in the fuel gas in this respect, and which cannot be changed during operation, there is the possibility with the present approach to take account of this by a regulation of the volume flow of the hydrocarbon compound(s) supplied to the individual stacks. The volume flow can thereby be increased, e.g. during start-up, successively up to the reaching of the operating point or load point. However, a change in the load point can also be achieved simply and with a small time constant by variation of these volume flows. An influencing of the temperature at or in the fuel cells of the stacks is thus also possible.

Since the reactively internally formed water can also be utilized in the process, the quantity of water is also reduced which is contained in the residual fuel gas and which has to be recirculated.

The required reformers and compressors can have smaller dimensions, which also reduces the required space requirements. Other apparatus or assemblies present in conventional systems can be dispensed with, whereby costs can be reduced.

A minimization of the portion of inert components contained in the removed residual fuel gas can be achieved, which has a positive effect on the power density of the individual stacks.

The invention should be explained in more detail by way of example in the following.

Figure 2:
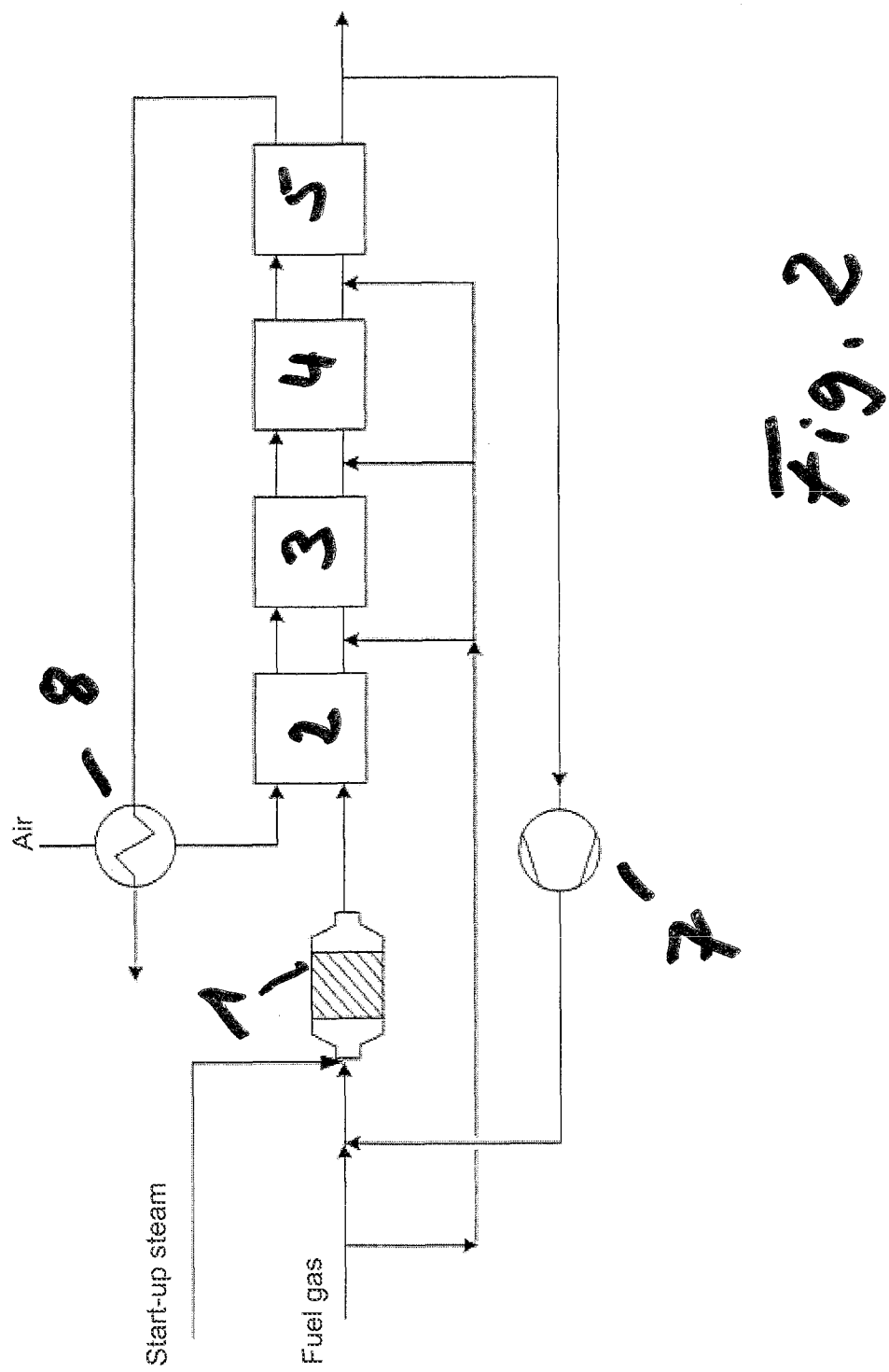
Figure 3:
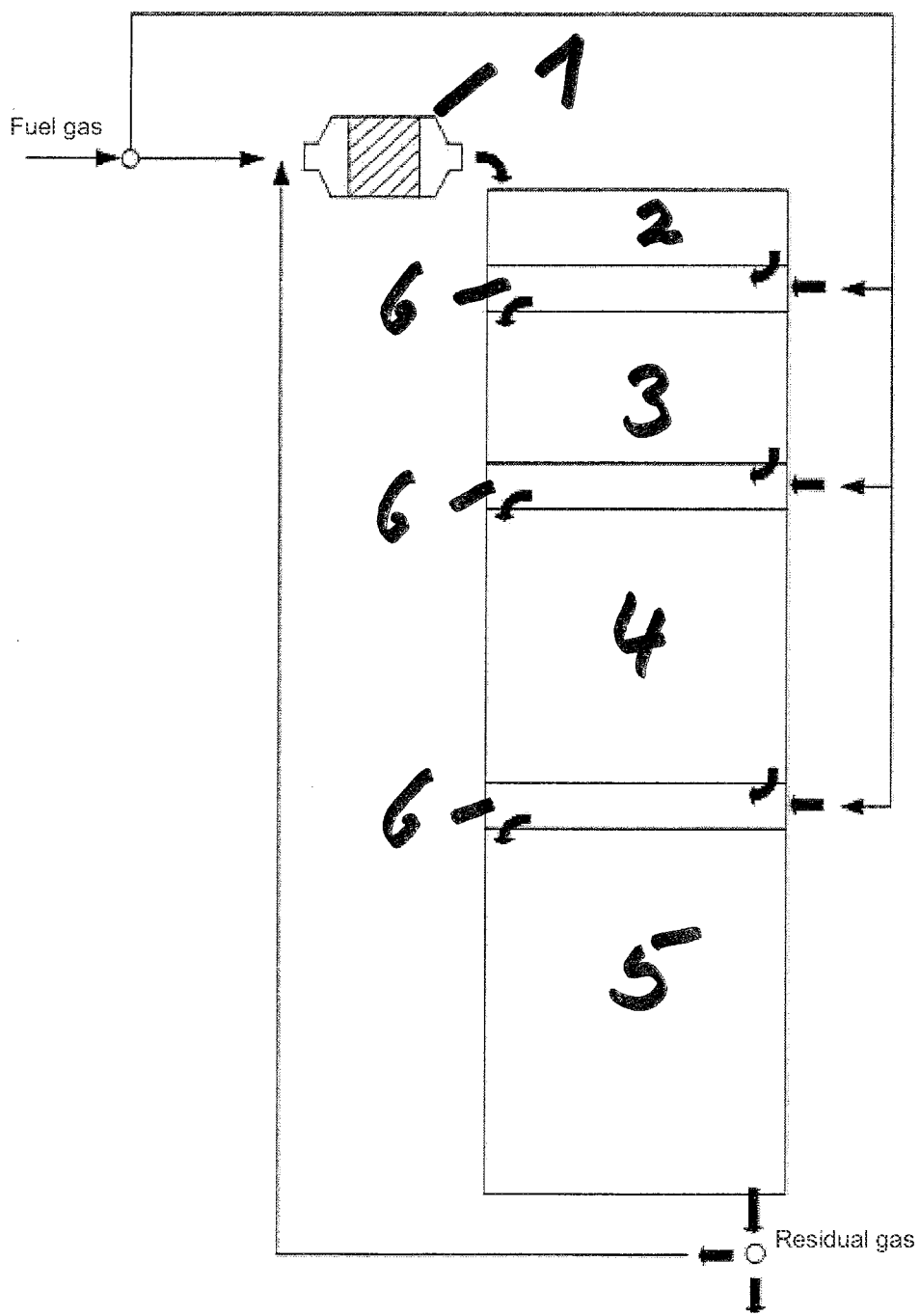
Figure 4:
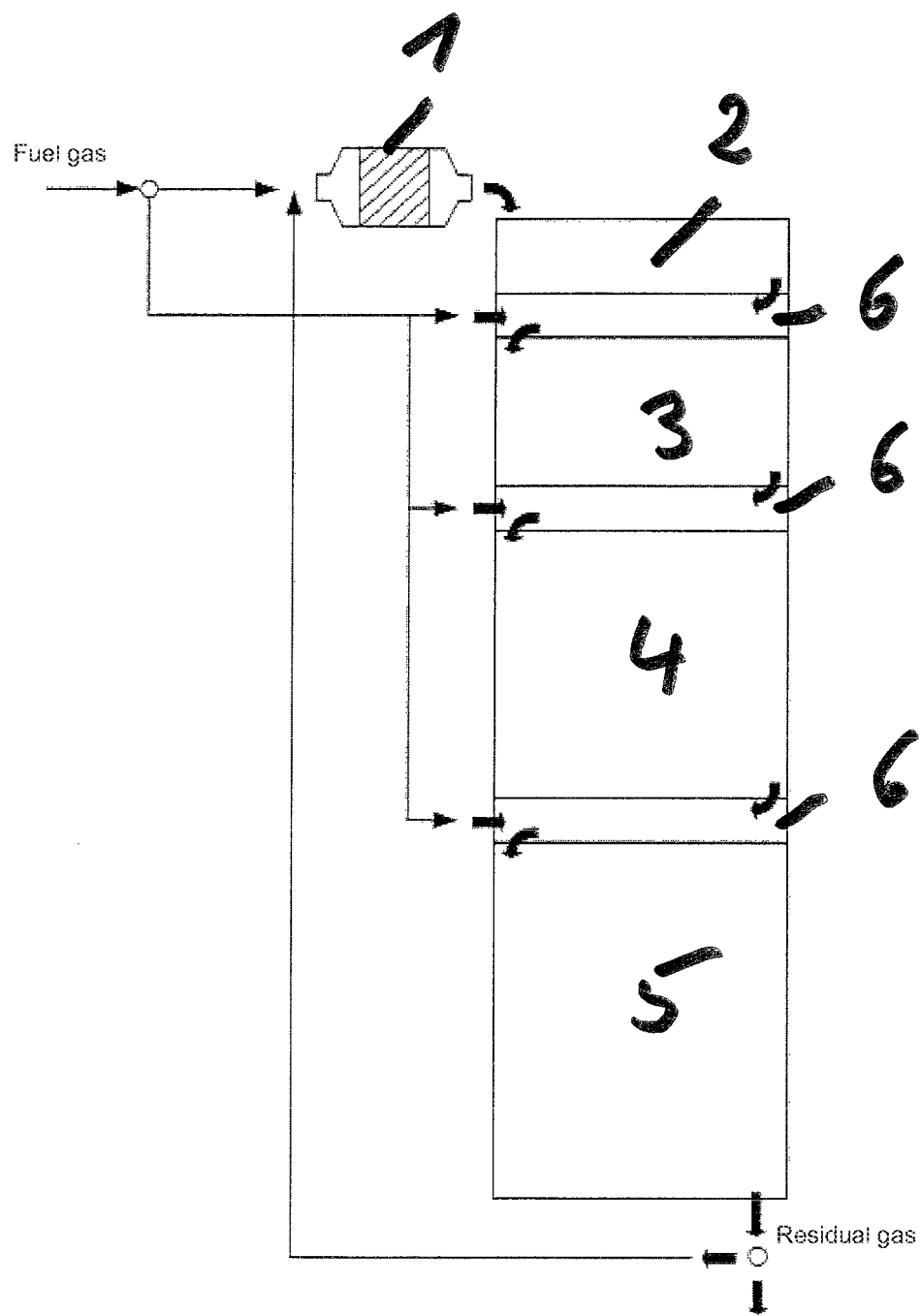
Figure 5:
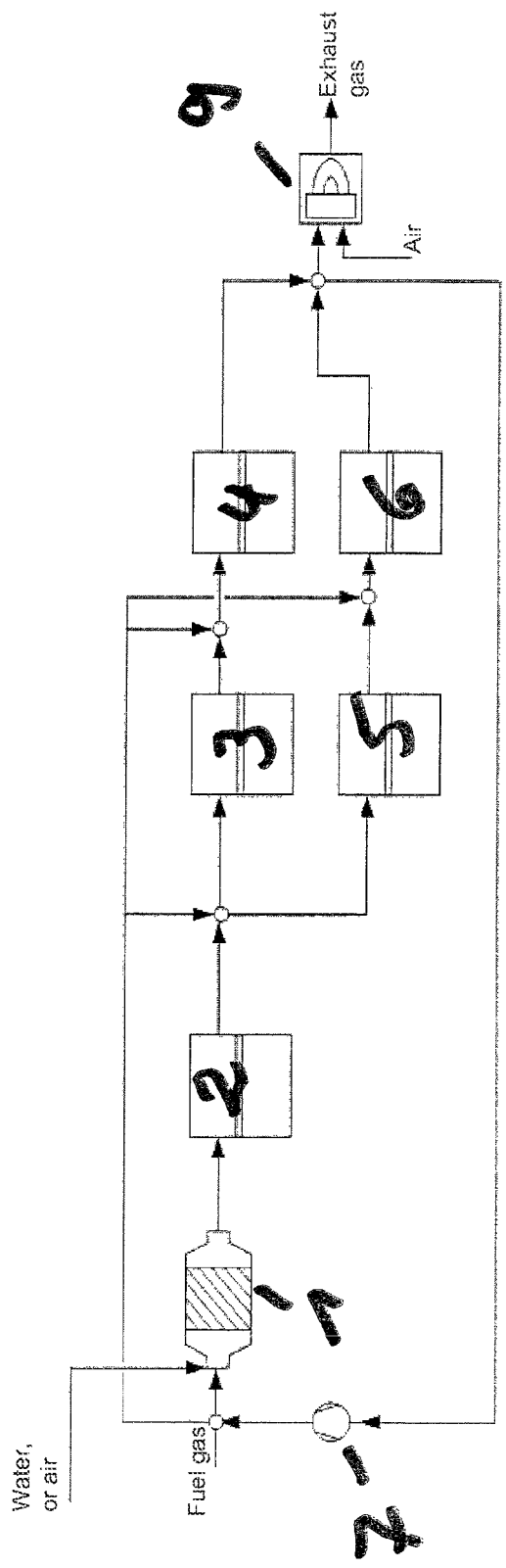

There are shown:

FIG. 1 a block diagram of an example of a system in accordance with the invention with a reformer for the carrying out of a partial oxidation;

FIG. 2 a block diagram of an example of a system in accordance with the invention with a steam reformer;

FIG. 3 a block diagram of an example of a system in accordance with the invention with adapter plates for the supply of methane or of a gas containing methane;

FIG. 4 a block diagram of an example of a system in accordance with the invention with a gas supply differing from the example in accordance with FIG. 3; and FIG. 5 a block diagram of an example in which stacks are connected in parallel electrically and fluidically.

In the example shown in FIG. 1, air and natural gas are supplied, as a gas containing methane, to a reformer 1 in which a partial oxidation takes place. The fuel gas obtained is supplied to a first stack 2 of fuel cells. This stack 2 is connected here to three further stacks 3, 4 and 5 fluidically in series so that fuel gas can flow from stack 2 to stack 5. Residual fuel gas can be removed simply and without any very complex and/or expensive post-treatment, which is indicated by the arrow subsequent to the stack 5.

In addition, natural gas is supplied via lines following stack 2 to stack 3, to stack 4 and to stack 5 for a direct internal reforming of the contained methane.

In this example, a respective external, separate supply of air to the cathode sides of the fuel cells has also been selected. This air therefore moves, as mentioned in the general part of the description, via separate connections into a stack 2, 3, 4 and 5. The required pressure which has to be generated using the compressor 8 can thus be selected to be smaller than in an air supply to the cathodes, as was selected in the example in accordance with FIG. 2. There is naturally the possibility also to use this form of the air supply to the individual stacks 2, 3, 4 and 5 in the example shown in FIG. 2.

In the example shown in FIG. 2, a steam reformer 1 was used into which residual fuel gas removed from the stack 5 can be returned. The volume flow of the residual fuel gas returned into the reformer 1 and useful for the steam reforming can be regulated. The natural gas flow supplied to the reformer 1 can likewise be regulated while taking account of the stoichiometry and the temperature in the reformer.

The volume flows of natural gas which can be supplied via the lines to the individual stacks 3, 4 and 5 can likewise be regulated individually and independently of one another.

In the example in accordance with FIG. 2, a compressor 7 is present in the return line for residual fuel gas to the reformer 1.

The examples shown in FIGS. 3 and 4 should in particular illustrate that the number of fuel cells which form a respective stack 2, 3, 4 and 5 or are combined to a stack successively increases, which has been indicated by the size of the respective drawn blocks.

The stacks 2, 3, 4 and 5 are each separated from one another by means of an adapter plate 6. Natural gas which is internally reformed in the stacks 3, 4 and 5 is additionally supplied via the adapter plates 6 to the stacks 3, 4 and 5.

In this respect, an indirect internal reforming can take place with the flow supply shown in FIG. 3 in the adapter plates 6 and a direct internal reforming in the fuel cells of the stacks 3, 4 and 5.

There is the possibility with the flow management of the additionally supplied natural gas, as is shown in FIG. 4, of being able to carry out a direct internal reforming in the fuel cells of the stacks 3, 4 and 5 and of being able to utilize its positive effects. In this respect, the reforming primarily takes place at the surface of anodes.

In the example shown in FIG. 5, fuel gas formed in the reformer 1 is supplied to a first stack 2. Two respective stacks 3 and 4 as well as 5 and 6 are connected in series both fluidically and electrically in the following direction of flow and, in this respect, however, the stack pairs 3 and 4 are connected in parallel to the stacks 5 and 6. Methane or gas containing methane can also be supplied separately here to each of the stacks 3, 4, 5 and 6. Residual fuel gas which is discharged from the stacks 4 and 6 can be returned into the reformer 1 with the help of the compressor 7 and a regulable valve. In this example, residual gas can also be conducted through an afterburner 9.

The invention claimed is:

1. A high-temperature fuel cell system which is operable with at least one hydrocarbon compound, the system including stacks including individual fuel cells connected electrically in series, said stacks being sequentially flowed through by fuel gas containing hydrogen which flows from a reformer into a first stack of the system and methane or gas containing methane is supplied via further connection lines sequentially in a direction of flow of the introduced fuel gas into said stacks arranged in the following for a direct internal reforming of at least one hydrocarbon compound to a fuel gas containing hydrogen at anodes of the fuel cells of the stack; wherein the system is configured such that air is supplied for oxidation at the cathode side to the individual fuel cells of the system; and wherein at least one of (1) the number of fuel cells forming a stack increases from stack to stack in the flow direction of the fuel gas through the system and (2) the size of the anode surfaces of fuel cells increases in this flow direction.

2. The system in accordance with claim 1, wherein the reformer includes a steam reformer into which residual fuel gas discharged from the system can be returned.

3. The system in accordance with claim 1, wherein the reformer is configured for a reforming by partial oxidation.

4. The system in accordance with claim 1, configured to be capable of supplying air, for oxidation, via a separate connection line to respective stacks.

5. The system in accordance with claim 1, wherein the stacks are separated from one another by respective adapter plates configured to be capable of supplying the hydrocarbon compound(s).

6. The system in accordance with claim 1, wherein a catalyst is arranged or a catalytically acting coating is formed in adapter plates and/or anode spaces of the fuel cells.

7. The system in accordance with claim 1, wherein the volume flow of hydrocarbon compound(s) which can be supplied to a stack is configured to be regulatable in dependence on the temperature and/or on the electrical power of the fuel cells.

8. The system in accordance with claim 1, wherein the volume flow of returned residual fuel gas is configured to be regulatable in dependence on the temperature and/or on the electrical power of the system.

9. The system in accordance with claim 1, wherein stacks of the system are electrically and fluidically connected in parallel.

10. The system in accordance with claim 1, wherein the hydrocarbon compound(s) is/are conducted through a cooler before the entry into a stack.

11. A high-temperature fuel cell system which is operable with at least one hydrocarbon compound, the system including:
   stacks, including individual fuel cells connected electrically in series, said stacks being configured to be sequentially flowed through by fuel gas including hydrogen that flows into a first stack of the system from a reformer and methane or gas containing methane supplied via further connection lines sequentially in the direction of flow of the introduced fuel gas into further stacks to a particular individual stack for a direct internal reforming of at least one hydrocarbon compound to a fuel gas containing hydrogen at anodes of the fuel cells of a particular individual stack, wherein the system is configured such that air is supplied via a separate connection line to respective stacks, for oxidation, at the cathode side to individual fuel cells of the system;
   a reformer, comprising a steam reformer configured to receive discharged residual fuel gas for return to the system, wherein the reformer is configured for reforming by partial oxidation;
   wherein at least one of (1) the number of fuel cells forming a stack increases in the flow direction of the fuel gas through the system and/or (2) the size of the anode surfaces of fuel cells increases in this flow direction;
   wherein the stacks are electrically and fluidically connected in parallel and are separated from one another by respective adapter plates configured to be capable of supplying the hydrocarbon compound(s);

a catalyst provided in the adapter plates or in anode spaces of the fuel cells;

a regulator, configured to regulate volume flow of hydrocarbon compound(s) supplied to a stack in dependence on temperature and/or on electrical power; and a cooler, fluidically coupled to the regulator, the cooler configured to conduct the hydrocarbon compound(s) before entry into a stack.

\* \* \* \* \*